(12) United States Patent
McAllister et al.

(10) Patent No.: US 8,199,649 B2
(45) Date of Patent: Jun. 12, 2012

(54) METHOD AND APPARATUS FOR REROUTING A CONNECTION IN A DATA COMMUNICATION NETWORK BASED ON A USER CONNECTION MONITORING FUNCTION

(75) Inventors: Shawn P. McAllister, Manotick (CA); Ronald Andrew Jeffery, Ottawa (CA); Jayanthi Venkatasubba, Nepean (CA)

(73) Assignee: Alcatel Lucent, Paris (FR)

( * ) Notice: Subject to any disclaimer, the term of this patent is extended or adjusted under 35 U.S.C. 154(b) by 1323 days.

(21) Appl. No.: 09/821,708

(22) Filed: Mar. 28, 2001

(65) Prior Publication Data
US 2004/0202112 A1     Oct. 14, 2004

(51) Int. Cl.
*H04L 12/26* (2006.01)
*G06F 15/173* (2006.01)

(52) U.S. Cl. .......... 370/235; 709/224; 709/239
(58) Field of Classification Search .......... 370/248, 370/216, 354, 244, 241.1, 250
See application file for complete search history.

(56) References Cited

U.S. PATENT DOCUMENTS

| | | | | |
|---|---|---|---|---|
| 5,241,534 A | * | 8/1993 | Omuro et al. | 370/218 |
| 5,347,271 A | * | 9/1994 | Iwasaki | 370/218 |
| 5,764,920 A | | 6/1998 | Cook et al. | |
| 5,872,770 A | * | 2/1999 | Park et al. | 370/241.1 |
| 6,049,530 A | * | 4/2000 | Petersen et al. | 370/248 |
| 6,061,735 A | * | 5/2000 | Rogers | 709/239 |
| 6,097,699 A | * | 8/2000 | Chen et al. | 370/231 |
| 6,167,025 A | * | 12/2000 | Hsing et al. | 370/216 |
| 6,301,252 B1 | * | 10/2001 | Rangachar | 370/395.2 |
| 6,304,549 B1 | * | 10/2001 | Srinivasan et al. | 370/230 |
| 6,470,385 B1 | * | 10/2002 | Nakashima et al. | 709/224 |
| 6,538,987 B1 | * | 3/2003 | Cedrone et al. | 370/216 |

(Continued)

FOREIGN PATENT DOCUMENTS
WO   WO 98/04097   1/1998
(Continued)

OTHER PUBLICATIONS

王廷尧(天津光电通信公司)—ATM 网络管理(ATM Network Management)《现代有线传输》1995 年第4 期_Apr. 1995, pp. 45-54, Tsinghua Tongfang Optical Disc Co., Ltd., China.

*Primary Examiner* — Clemence Han
(74) *Attorney, Agent, or Firm* — Ross D. Snyder & Associates, Inc.

(57) ABSTRACT

A method and apparatus for rerouting connections in a data communication network based on detection of faults or other undesirable characteristics using a user connection monitoring function is presented. After a connection is established that is managed by a control plane, the status of characteristics of the connection is monitored using a user connection monitoring function. In one embodiment, the user connection monitoring function includes the use of operation and management (OAM) cells. When the status of one or more of the selected characteristics being monitored is determined to be unacceptable, control plane rerouting of the connection is initiated. Selected characteristics that may be monitored using the user connection monitoring function include, for example, continuity, data corruption, data loss, latency, and misinsertion of data. The reroute initiated in response to the unacceptable characteristic may be a hard reroute or a soft reroute.

39 Claims, 3 Drawing Sheets

U.S. PATENT DOCUMENTS

| | | | |
|---|---|---|---|
| 6,594,235 B1 * | 7/2003 | Rochberger et al. | 370/238 |
| 6,597,689 B1 * | 7/2003 | Chiu et al. | 370/354 |
| 6,633,569 B2 * | 10/2003 | Hemmady | 370/398 |
| 6,636,484 B1 * | 10/2003 | Agrawal et al. | 370/248 |
| 6,735,176 B1 * | 5/2004 | So | 370/237 |
| 7,062,642 B1 * | 6/2006 | Langrind et al. | 713/1 |
| 2001/0043564 A1 * | 11/2001 | Bloch et al. | 370/230 |
| 2002/0006114 A1 * | 1/2002 | Bjelland et al. | 370/248 |
| 2002/0015386 A1 * | 2/2002 | Kajiwara | 370/248 |
| 2002/0141342 A1 * | 10/2002 | Furman et al. | 370/235 |
| 2003/0189926 A1 * | 10/2003 | Watanabe et al. | 370/389 |
| 2005/0259571 A1 * | 11/2005 | Battou | 370/217 |
| 2008/0095045 A1 * | 4/2008 | Owens et al. | 370/220 |
| 2009/0040921 A1 * | 2/2009 | Gan et al. | 370/217 |

FOREIGN PATENT DOCUMENTS

| | | |
|---|---|---|
| WO | WO 99/49693 | 9/1999 |

* cited by examiner

METHOD AND APPARATUS FOR REROUTING A CONNECTION IN A DATA COMMUNICATION NETWORK BASED ON A USER CONNECTION MONITORING FUNCTION

FIELD OF THE INVENTION

The invention relates generally to data communication and more particularly to a method and apparatus for rerouting a connection in a data communication network based on a user connection monitoring function.

BACKGROUND OF THE INVENTION

Data communication networks are commonly used to transport data between end users. In many cases, virtual connections are established between particular end users to facilitate the transport of data. In some instances, these connections are switched virtual connections, or switched virtual circuits, whereas in other cases, the connections are more permanent in nature.

Some types of connections are established with the capability of self-rerouting if faults or other problems arise which by inference mean that the flow of data over the connection will be negatively affected (e.g. A physical link failure stops data flow on all connections on that link). One such type of connection is a soft permanent virtual connection (SPVC), which is a type of connection often employed in asynchronous transfer mode (ATM) networks. SPVCs provide an advantage in that the network manager does not have to interact with every switch along the path of the SPVC, but rather merely configures the endpoints and the network is able to select an appropriate path over which to map the SPVC. SPVCs provide an advantage in that they can quickly recover from faults that impede the flow of data.

In prior art systems, reroutes of SPVC connections are typically triggered upon detection of control plane faults (e.g. signaling link failure) or physical layer faults (e.g. physical link failure). Detection of such faults is used to infer a fault in the user plane of the SPVCs that are controlled by the signaling link or riding on the physical link. Similarly, the lack of such control plane faults and physical layer faults is used to infer the well-being of the user plane connections that they manage. However, the actual status of the user plane connection itself at the ATM layer, or at a similar layer in other protocol networks, is not used in such prior art systems as a potential trigger for rerouting an SPVC. This is undesirable, as the well being of the user plane connection itself is what subscribers, or users of the network, perceive. In some instances, the user plane may be experiencing problems that are not evidenced by faults detectable in the control plane or physical layer entities. As such, a user plane fault may not trigger a reroute while still causing problems.

Therefore, a need exits for a method and apparatus for rerouting connections that is capable of detecting user plane faults that may not be detectable using control plane or physical layer monitoring.

DETAILED DESCRIPTION

Generally, the present invention provides a method and apparatus for rerouting connections in a data communication network based on detection of faults or other undesirable characteristics using a user connection monitoring function. After a connection is established that is managed by a control plane, the status of characteristics of the connection is monitored using a user connection monitoring function. In one embodiment, the user connection monitoring function includes the use of operation and management (OAM) cells. When the status of one or more of the selected characteristics being monitored is determined to be unacceptable, corrective action such as control plane rerouting of the connection is initiated. Selected characteristics that may be monitored using the user connection monitoring function include, for example, continuity, data corruption, data loss, latency, and misinsertion of data. The reroute initiated in response to the unacceptable characteristic may be a hard reroute or a soft reroute.

By utilizing the user connection monitoring function, a user's perspective on the connection is an additional indicator used for determining whether or not corrective action on the connection is required. Because the user may perceive data flow problems that are not ascertainable based on control plane or physical layer fault detection schemes used in prior art systems, utilization of the user connection monitoring function for monitoring the connection ensures that such user plane problems are detected. As such, a user plane problem that could be perceived as troublesome to a user but not recognized in prior art systems is readily ascertained and corrective action can be taken to alleviate the problem. By combining the user plane monitoring with prior art connection-monitoring techniques, a more complete connection monitoring technique is achieved.

Figure 1:
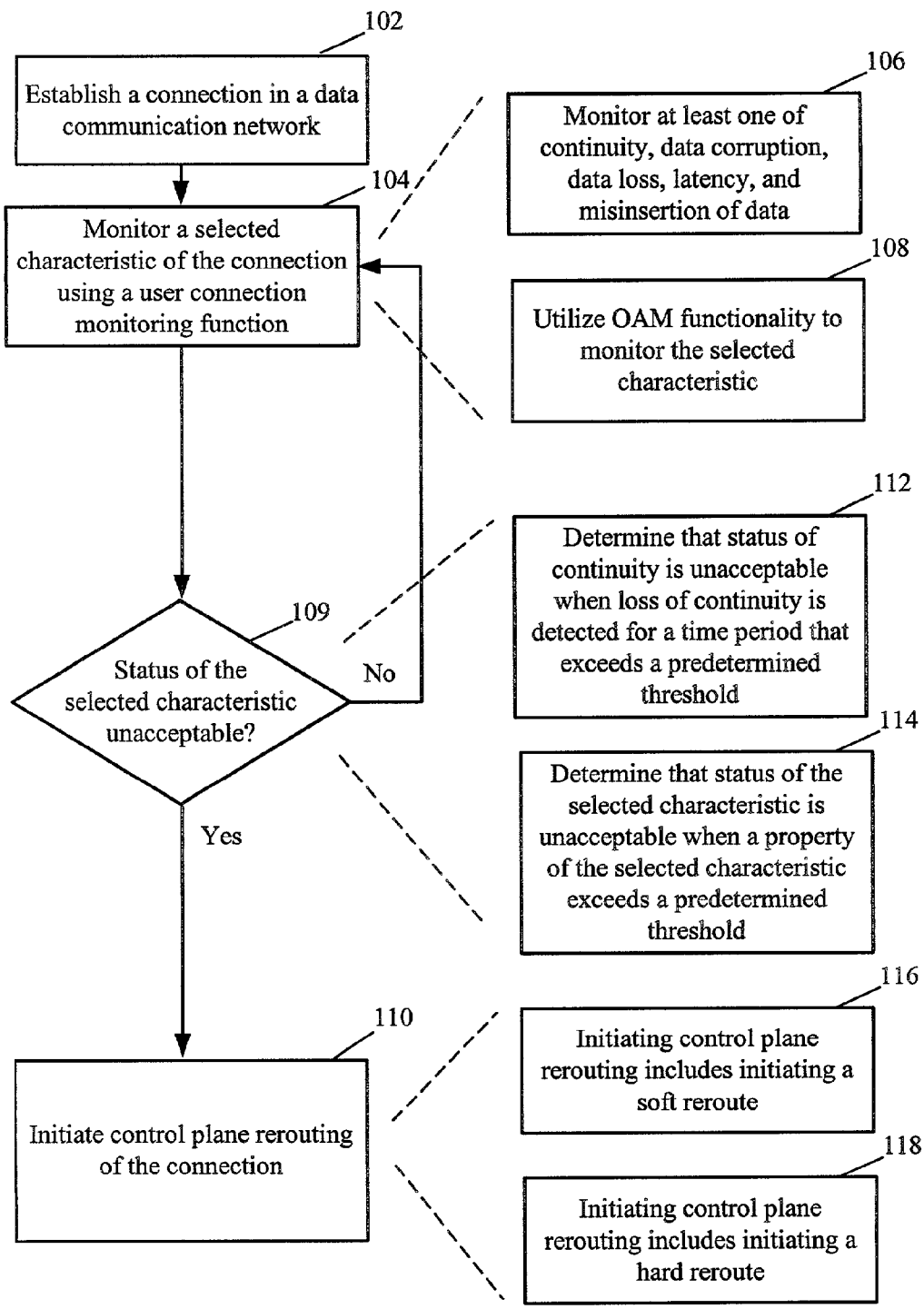
FIG. 1 illustrates a flow diagram of a method for rerouting a connection in a data communication network in accordance with a particular embodiment of the present invention.
Figure 2:
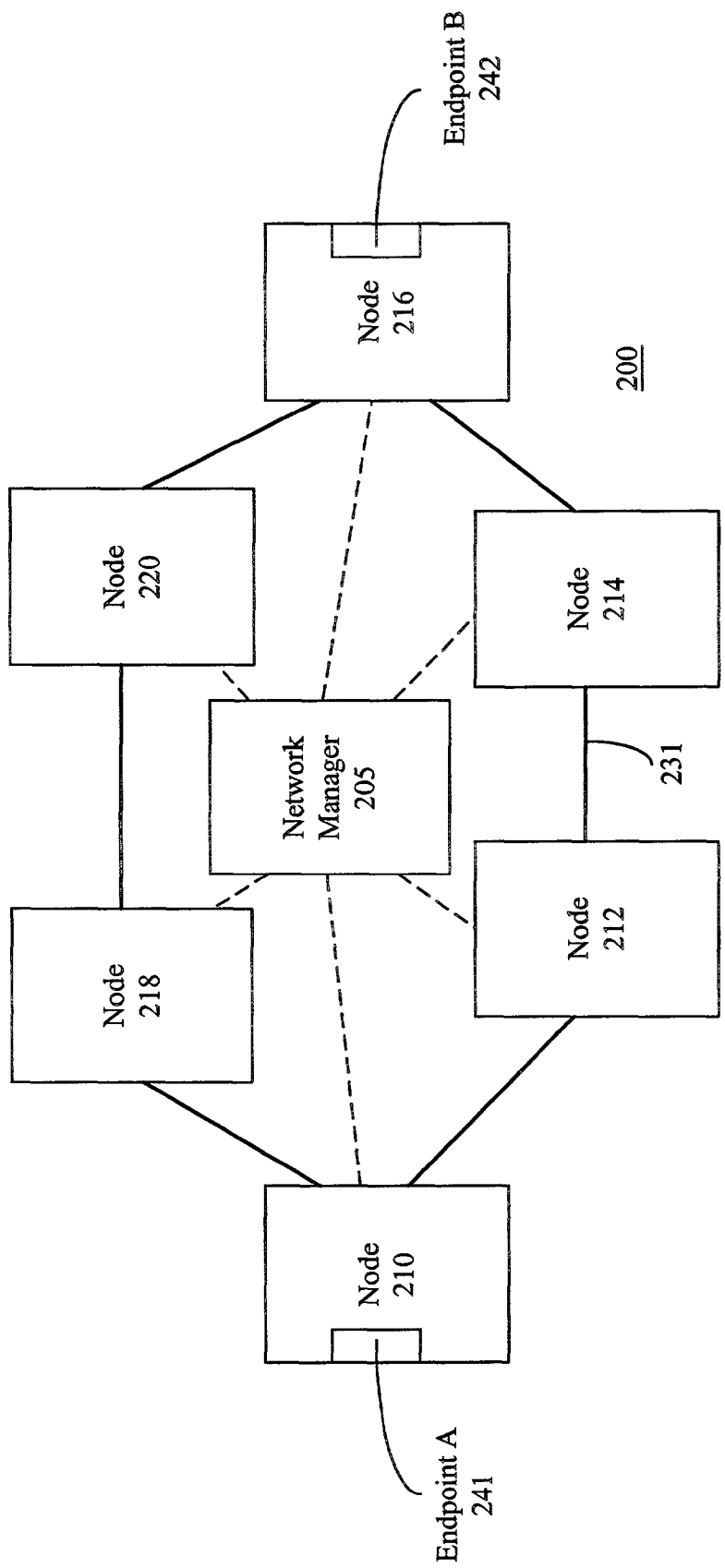
FIG. 2 illustrates a block diagram of a communication system within which connection rerouting based on user plane fault detection can occur in accordance with a particular embodiment of the present invention.
Figure 3:
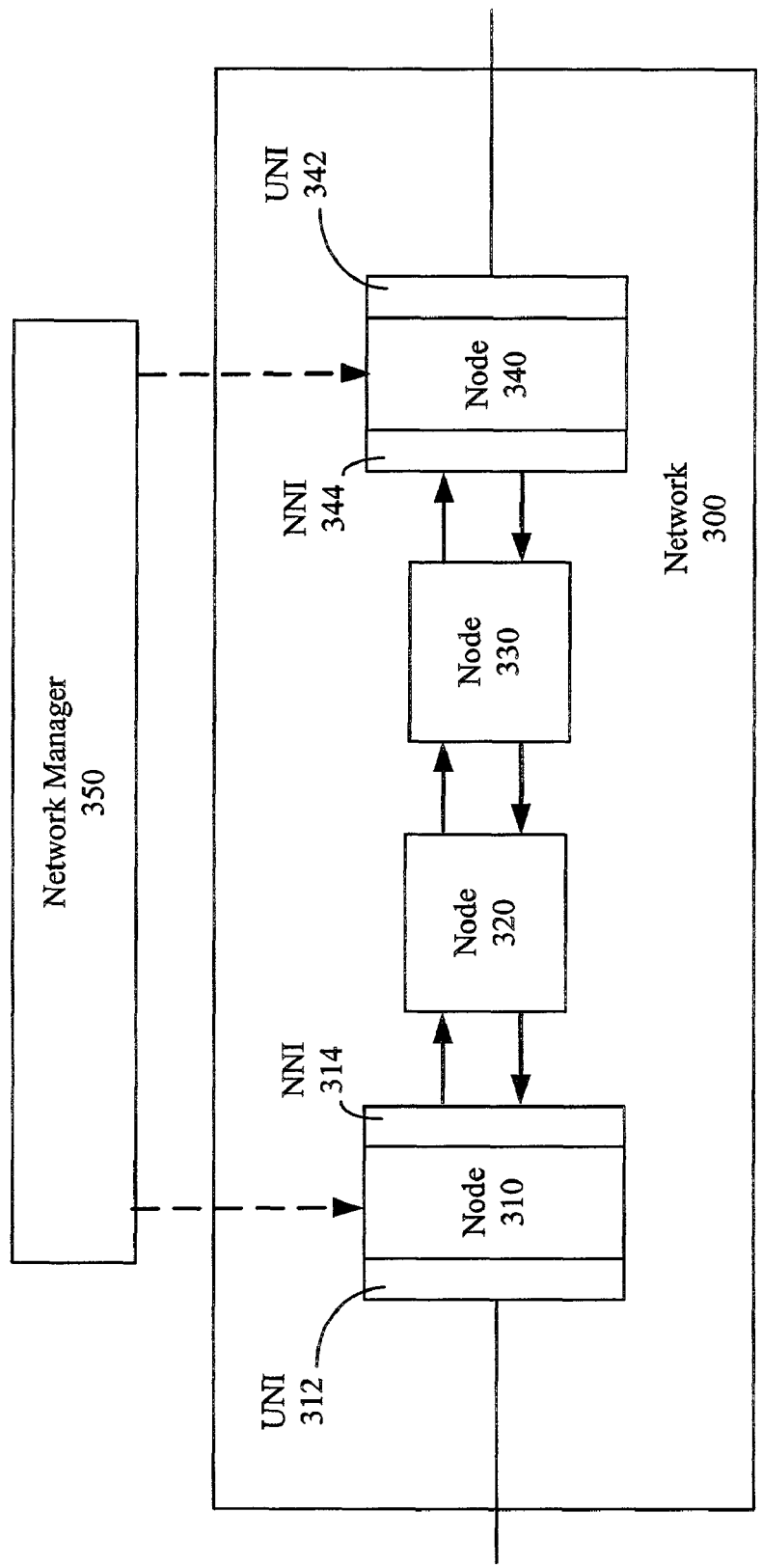
FIG. 3 illustrates a block diagram of a network controlled by a network manager, where reroutes within the network may be triggered based on faults detected using a user connection monitoring function in accordance with a particular embodiment of the present invention.

The invention can be better understood with reference to FIGS. 1-3. FIG. 1 illustrates a flow diagram of a method for rerouting a connection in a data communications network. The data communication network may support a variety of protocols, including asynchronous transfer mode (ATM), multi-protocol label switching (MPLS), Frame Relay, or other cell- or packet-based data transmission protocols that may rely on virtual connections, switched paths, or similar constructs to transport data. In other embodiments, networks that utilize wavelength switching may benefit from the techniques described herein.

The method of FIG. 1 begins at step 102 where a connection is established in the data communications network. The connection is managed by a control plane, which may be a signaling plane that utilizes protocols such as private network-to-network interface (PNNI). The connection may be a switched connection, such as a soft permanent virtual connection (SPVC), or a switched virtual connection (SVC). In other embodiments, paths such as MPLS or LSP types of paths may be the "connections" that are monitored and maintained.

Once established, the connection may be monitored using conventional control plane and physical layer monitoring schemes that are capable of detecting control plane faults and physical layer faults. However, based on the teachings of the present invention, such monitoring techniques are supplemented through the use of a user connection monitoring function. At step 104, at least one selected characteristic of the connection is monitored using such a user connection monitoring function. The user connection monitoring function monitors the connection from the same perspective as a user making use of the connection. As such, if the user data is not being properly transmitted along the connection (possibly due to faults), the monitoring occurring based on step 104 will detect such a lack of proper data flow.

The monitoring performed at step 104 may include monitoring specific selected characteristics as illustrated at step 106. At step 106, characteristics such as continuity, data corruption, data loss, latency, and misinsertion of data are monitored. Continuity monitoring will determine if the data flow along the connection is interrupted such that data flow is essentially halted. Data corruption monitoring may determine whether or not an unacceptable percentage of the data cells or packets being transmitted along the connection are corrupted while in transit. Data loss monitoring can be used to determine whether or not an unacceptable percentage of the data being transmitted along the connection is lost while in transit, where data loss differs from data corruption in that no data is received at the destination portion of the connection when data loss occurs, whereas corrupted data is received at the destination when data corruption occurs.

Monitoring the latency of data along a connection can be used to determine whether or not an unacceptable amount of time is required for data to traverse the connection from the source node within the network to the destination node. For example, a user may pay for a specific type of service over the connection, where such a service guarantees a certain maximum latency for data traffic. If this guaranteed latency is exceeded, rerouting of the connection may be desirable in order to provide the level of service guaranteed to the user. Misinsertion of data may occur when data intended for one connection is mistakenly inserted onto another connection such that it does not arrive at the proper destination. It should be noted that a number of other monitoring functions not described in detail herein may be used to determine when an unacceptable condition has arisen on a connection such that rerouting or other corrective action is desirable.

Within an ATM system, the monitoring performed at step 104 may include the use of OAM cells as illustrated in step 108. At step 108, OAM functionality is utilized to monitor the one or more selected characteristics for the connection. OAM functionality is known in the art. Utilization of OAM functionality includes configuring an OAM cell source, which generates OAM cells, and an OAM sink, which extracts OAM cells from a data stream. The OAM source generates the OAM cells and periodically injects the OAM cells into the user data stream such that the OAM cells traverse the network in the same manner as user data. Upon receipt at the node that includes the OAM sink, the OAM cells are recognized and extracted from the data stream for analysis.

OAM cells used for monitoring continuity checking may be injected into the user data stream either on a periodic basis independent of the flow of user data, or may be injected only when there is insufficient user data being transmitted to allow for continuous monitoring of continuity along the connection. In order to validate continuity, an OAM sink at the destination node of the connection may monitor the connection for any type of data flow, where such data flow may include standard user data or OAM cells that may be injected merely to ensure that some level of data flow is provided along the connection. If no flow of data is detected by the node that includes the OAM sink (i.e. no cells are being received within the node), a loss of continuity along the connection has occurred. In some instances, a configurable threshold level may be established for such a loss of continuity detection, such that if no cells corresponding to the connection are received for a time period that exceeds a predetermined time period, a loss of continuity (LOC) condition may be detected.

The type of OAM cells used to monitor continuity may be referred to as OAM continuity checking (CC) cells. In addition to OAM CC cells, OAM performance monitoring (PM) cells may be utilized to monitor other characteristics of the connection. Thus, whereas OAM CC cells merely indicate whether or not continuity is present along the connection, OAM PM cells can be used to verify the actual performance of the user plane connection (in addition to verifying continuity). For example, OAM PM cells may be used to verify that a certain level of user plane performance that has been guaranteed to a user is being provided. In performance monitoring, configurable thresholds may exist for the various characteristics that are monitored by OAM PM cells, whereas an unacceptable level on any particular characteristic may be used to detect a situation that requires a reroute in order to ensure that the user's needs are adequately met. Thus, a plurality of selected characteristics may be monitored, where if a particular property corresponding to one of these characteristics exceeds a corresponding predetermined threshold for that characteristic, a reroute may be triggered.

Because different thresholds may be appropriate for different connections, flexibility may be achieved by ensuring that the various predetermined thresholds associated with various characteristics can be configured. Such configuration may occur at the instantiation of the connection, or may be a dynamic process that allows for such predetermined thresholds to be modified after the connection has been established such that dynamic alternation of the connection characteristics can be achieved.

At step 109, it is determined whether or not the status of one or more of the selected characteristics being monitored is unacceptable. If not, the method returns to step 104 and the monitoring function continues. If it is determined at step 109 that the status of one or more of the selected characteristics is unacceptable, the method proceeds to step 110 where control plane rerouting of the connection is attempted.

As described above, the determination at step 109 that the status of the selected characteristic is unacceptable may include determinations such as those illustrated in steps 112 and 114. At step 112, the status of the continuity is determined to be unacceptable when loss of continuity is detected for a time period that exceeds a predetermined threshold. At step 114, the status of the selected characteristic is determined to be unacceptable when a property of the selected characteristic exceeds a predetermined threshold established for that characteristic.

The initiation of control plane rerouting performed at step 110 may include performing a soft reroute at step 116 or performing a hard reroute at step 118. A hard reroute implies that the old connection is released while (or before) the new connection is established such that the old connection is abandoned irregardless of the performance obtained through the use of the new connection. As such, a hard reroute may result in the establishment and initial use of a new connection that provides even worse performance than the old connection which was abandoned based on its inability to support the data flow characteristics required.

In the case of a soft reroute, which may also be referred to as a "bridge and roll", an evaluation of the new connection may be performed before the old connection is abandoned and the data flow is rerouted over the new connection only if its characteristics are better than those of the old connection. Whether a hard reroute or a soft reroute is performed at step 100 may be based on the type of characteristic that has been determined to be unacceptable at step 109. For example, in the case of a loss of continuity, a hard reroute is likely to produce an improved new connection as the loss of continuity on the old connection essentially makes the old connection useless. However, if the selected characteristic deemed unacceptable at step 109 is associated with the performance of the connection, such as the latency along the connection, a soft reroute may be preferable in order to ensure that the new connection provides better latency performance than the old connection before the old connection is abandoned in favor of the new connection.

Although the techniques illustrated in FIG. 1 have been described primarily with respect to an ATM data communication network, it is apparent to one of ordinary skill in the art that similar techniques may benefit other types of data communication protocols. For example, a data communication network may support MPLS data communication, where the control plane in such an MPLS system may employ signaling protocols such as CR-LDP or RSVP, while relying on a routing protocol such as OSPF or IS-IS. In such a communication network, the connection may be a label switched path (LSP) that is monitored from a user perspective in order to ascertain whether or not the LSP is providing the level of service agreed upon by the network manager and the user relying on the LSP. The specific user plane monitoring technique relied upon in MPLS may be as simple as a ICMP Echo ("ping" type) communication or MPLS-specific inband management packets, which may be analogous to OAM CC cell traffic in an ATM network, or it may be more complex such that functionality similar to that provided by OAM PM cells is achieved. Similarly, these techniques may also be applied to switching of wavelength paths.

In communication networks that support yet other protocols, the specific type of user connection is dependent upon the type of protocol utilized within the network, and the monitoring technique used to detect faults within the user plane may either be built into the particular protocol being supported or may be generated specifically to provide such user plane verification functionality. As is apparent to one of ordinary skill in the art, the particular monitoring function may be specifically tailored to suit the characteristics to be monitored such that the monitoring activities are efficient and do not unnecessarily impact the normal flow of user data in a detrimental fashion.

FIG. 2 illustrates a block diagram of a general communication system 200 that includes a plurality of nodes 210-220 that are controlled by a network manager 205. The nodes 210-220 are intercoupled in a manner that allows for data communication amongst the nodes included in the system 200.

In one example, a connection may be established between endpoint A 241 and endpoint B 242. Initially, data being transmitted from endpoint A 241 to endpoint 242 may traverse the network by starting at node 210, traveling through nodes 212 and 214, and finally arriving at node 216. Assuming that the link 231 that connects nodes 212 and 214 is physically severed, conventional control plane and/or physical layer monitoring that exists within the network will flag the failure such that a reroute of the connection through nodes 218 and 220 is initiated. However, if a problem arises along the initial connection that is not detectable using the control plane or physical layer monitoring that exits in prior art systems, no such rerouting may occur and the user relying on the connection to transfer data between endpoints A and B 241 and 242 may be disappointed.

Thus, although the connection may appear fine from the perspective of the control plane and no problems may exist on the physical links coupling the various nodes included in the connection, other conditions may exist that cause a service interruption or degradation, such as a stoppage or an unreasonable delay of data flow along the connection. Some specific examples may include a software fault (a specific card on one of the nodes is inadequately programmed), or a policing configuration that discards too much of the data included in the data stream traversing the connection, or switching fabric faults within a node.

Embodiments of the present invention ensure that such inadequacies along the connection that are not detectable based on conventional control plane and physical layer monitoring are not left undetected. By employing a user connection monitoring function within the system, a lack of continuity or an inadequate level of performance along the connection can be detected such that a reroute or other corrective action is triggered in a similar manner as would occur if a signaling link failure or physical link failure were detected, in order to restore an acceptable level of service.

In order to accomplish the user plane monitoring function, the source node, in this case node 210, may inject diagnostic traffic into the standard user data stream. In a particular example, the node 210 may include an OAM cell source, where the OAM cells may be OAM CC cells or OAM PM cells. In other embodiments, similar diagnostic traffic may be injected into data streams corresponding to protocols other than ATM. The destination node, in this case node 216, monitors the diagnostic traffic in the data stream in order to detect problems that exist along the connection as viewed from a user perspective. In the case where the source node includes an OAM source, the destination node may include an OAM sink which extracts the OAM cells, and in the case of performance monitoring cells, analyzes their receipt and content to determine the performance of the connection.

Based on the status of the selected characteristics monitored through the user connection monitoring function, control plane rerouting can be initiated such that a second connection is established between the source node and the destination node when the performance of the initial connection is unacceptable. Note that the monitoring function can be used to monitor data flow in both directions with respect to a connection. Each endpoint of the connection may include a source and sink in order to verify continuity along the connection such that the reroute (or other corrective action) is triggered when a loss of continuity is detected. In other embodiments, the reroute may be triggered by inadequate performance along the connection, where such inadequate performance may include an unacceptable latency along the connection, unacceptable cell loss, etc.

The determination that unacceptable performance exists along the initial connection may be based on one or more predetermined thresholds associated with the various characteristics. This was described above with respect to FIG. 1. Furthermore, the reroutes initiated may include soft or hard reroutes, where the determination as to which type of reroute to perform may be based on the unacceptable condition that exists on the initial connection.

FIG. 3 illustrates a network 300 that includes a plurality of nodes 310, 320, 330, and 340, where the network 300 is managed by a network manager 350. In the case where the network 300 supports ATM functionality such that the various nodes 310, 320, 330, and 340 are ATM nodes, or switches, the specific connections supported may include SPVC's. In such a network, the techniques described herein may allow the network to recover from many types of data flow interruptions on the SPVC paths by initiating a reroute when such data flow interruptions are detected. Such added functionality increases the robustness of the SPVC's, which may help to provide the level of service expected by subscribers who pay for such SPVC services.

In order to detect the data flow interruptions, OAM CC cells may be utilized within the network 300. Assuming that the nodes 310 and 340 serve as source and destination nodes, respectively, for a connection that also utilizes nodes 320 and 330, the nodes 310 and 340 may include user network interface (UNI) ports 312 and 342, respectively. The UNI ports 312 and 342 may provide the connection points for customer premises equipment (CPE). The endpoint nodes 310 and 340 may also include network-to-network interface (NNI) ports 314 and 344, respectively, that couple the endpoint nodes to the other nodes within the network. As such, in various embodiments the monitoring function may be performed either at UNI ports or NNI ports, and the monitoring can be used to help maintain NMS PVCs or SPVCs.

In order to support rerouting of SPVC's based on the determination that a lack of continuity condition exists, OAM CC source and sink points may be enabled at the NNI or UNI portions 314 and 344 of the endpoint nodes 310 and 340, respectively. Both the source and destination nodes 310 and 340 should be capable of running OAM CC and also capable of serving as SPVC endpoints. However, no such requirement exists for the intermediate nodes 320 and 330 that may exist along the connection. Furthermore, no specialized functionality is required by intermediate nodes along the path in order to ensure that continuity exists along the connection, as well known OAM CC functionality is capable of ascertaining whether or not a lack of continuity condition exists.

Although a portion of the SPVC path between the UNI and NNI cards on the source and destination nodes is not monitored for continuity verification, it may be preferable to establish the OAM CC source and sink points on the NNI cards 314 and 344 for other reasons. A first reason is that SPVCs may originate or terminate on UNI cards that do not support OAM CC, and as such, attempting to establish source and sink points to ensure continuity at such UNI cards would fail and defeat the user plane monitoring functionality desired. Secondly, if OAM CC is run between the UNI cards, physical removal or reset of the UNI card at either the source or destination node may cause the SPVCs originating or terminating at that UNI card to be rerouted repeatedly until the UNI card becomes functional. Such a condition is highly undesirable as it wastes network resources.

In specific operation, the network manager 350 creates the initial SPVC path definition and enables the SPVC rerouting on a loss of continuity condition for the SPVC path defined. Such functionality within the network manager 350 may be controlled through a graphical user interface by an operator of the network manager 350. Following the path definition, the network manager 350 sets up the SPVC and establishes the OAM CC segment source and sinks at the NNI cards 314 and 344. Once established, the OAM CC continues to run between the NNI's. Note that in other embodiments, the sources and sinks may be set up at UNI interfaces. As such, the description provided with respect to NNI-NNI monitoring can easily be extrapolated to understand the UNI-UNI case.

When the NNI card at either the source or destination detects loss of continuity on the SPVC path, it may send a message to a call processing entity with the indication that a loss of continuity has been detected. In the case of SPVC's, rerouting may be performed without the intervention of the network manager 350. As such, the call processing entity within the node that detects the loss of continuity may cause the SPVC to be released. Such release may include the communication of a cause code that includes diagnostic information such that the loss of continuity detection can be pinpointed to either the source or destination node. Once this has occurred, the call processing entity at the source node can reestablish an SPVC path, where such reestablishment may utilize standard routing procedures such that no special effort may be made to avoid the previous path. In other embodiments, the nodes included in the original path or the likely location of the problem causing the lack of continuity may be taken into account when the rerouting occurs.

As is apparent to one of ordinary skill in the art, rerouting based on a loss of continuity detected for an SPVC path may be undesirable in some network applications. As such, it may be desirable to allow such rerouting based on loss of continuity to be toggled on and off for specific SPVCs, or for various portions of the network in general. Furthermore, additional configurability may be achieved if rerouting of SPVC's is also enabled based on substandard performance on a particular SPVC, where the performance may be monitored using OAM PM cells.

Generally, the present invention provides a method and apparatus for rerouting connections in a data communication network based on the detection of faults in the connection based on a user plane monitoring technique. When such faults are detected in the connection, a reroute of the connection is triggered based on the fault that is detected. As indicated herein, such faults may include loss of continuity or substandard performance for parameters typically associated with cell or packet traffic in a communication network.

By enabling the traffic along a connection to be monitored from a user perspective using diagnostic traffic such as OAM cells, problems along the connection that may not have been detected with prior art monitoring techniques may be readily ascertained such that reroutes can be triggered and adequate data flow ensured. As described herein, the applicability of such monitoring techniques extend beyond ATM networks, and are readily applied to other protocols such as MPLS where substandard performance along an LSP may be used to trigger such a reroute condition.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for rerouting a connection in a data communication network, comprising:

establishing the connection in the data communication network, wherein the connection is managed by a control plane;

monitoring status of a selected characteristic of the connection using a user connection monitoring function; and when the status of the selected characteristic is determined to be unacceptable, initiating control plane rerouting of the connection, wherein the user connection monitoring function includes OAM continuity checking, wherein initiating control plane rerouting of the connection comprises evaluating a new connection before the connection is abandoned, wherein the control plane rerouting over the new connection occurs when a new connection selected characteristic of the new connection is better than the selected characteristic of the connection.

2. The method of claim 1, wherein the selected characteristic includes continuity on the connection.

3. The method of claim 1, wherein the selected characteristic includes at least one of: data corruption on the connection, data loss on the connection, latency along the connection, and misinsertion of data on the connection.

4. The method of claim 1, wherein the data communication network supports asynchronous transfer mode (ATM) protocol.

5. The method of claim 4, wherein the control plane is a signaling plane.

6. The method of claim 5, wherein the signaling plane uses private network-to-network interface (PNNI).

7. The method of claim 6, wherein the connection is a soft permanent virtual connection (SPVC).

8. The method of claim 6, wherein the connection is a switched connection.

9. The method of claim 8, wherein the user connection monitoring function utilizes operation and management (OAM) traffic.

10. The method of claim 9, wherein the user connection monitoring function includes OAM performance monitoring.

11. The method of claim 10, wherein determining that the status of the selected characteristic is unacceptable further comprises determining that a property of the selected characteristic exceeds a predetermined threshold.

12. The method of claim 11, wherein the selected characteristic further comprises a plurality of selected characteristics, wherein each selected characteristic of the plurality of selected characteristics has a corresponding predetermined threshold, wherein determining that the status of the selected characteristic is unacceptable includes determining that a property corresponding to at least one selected characteristic of the plurality of selected characteristics exceeds the corresponding predetermined threshold for the at least one selected characteristics.

13. The method of claim 12, wherein at least a portion of the corresponding predetermined thresholds for the plurality of selected characteristics is configurable.

14. The method of claim 1, wherein the data communication network supports Multi-Protocol Label Switching (MPLS).

15. The method of claim 14, wherein the control plane includes at least one of Label Distribution Protocol (LDP) and ReSerVation Protocol (RSVP).

16. The method of claim 14, wherein the connection is a Label Switched Path (LSP).

17. The method of claim 16, wherein the user connection monitoring function monitors continuity along the connection.

18. The method of claim 16, wherein the user connection monitoring function monitors at least one of: data corruption on the connection, data loss on the connection, latency along the connection, and misinsertion of data on the connection.

19. The method of claim 1 wherein, when the status of the selected characteristic is determined to be unacceptable, the connection still appears fine from the perspective of the control plane.

20. The method of claim 1 wherein, when the status of the selected characteristic is determined to be unacceptable, the status of the selected characteristic determined to be unacceptable is not detectable using control plane monitoring.

21. The method of claim 1 wherein, when the status of the selected characteristic is determined to be unacceptable, the status of the selected characteristic determined to be unacceptable is not detectable using physical layer monitoring.

22. The method of claim 1 wherein, when the status of the selected characteristic is determined to be unacceptable, the status of the selected characteristic determined to be unacceptable is caused by a software fault.

23. The method of claim 1 wherein, when the status of the selected characteristic is determined to be unacceptable, the status of the selected characteristic determined to be unacceptable is caused by a policing configuration that discards too much of data included in a data stream traversing the connection.

24. The method of claim 1 wherein, when the status of the selected characteristic is determined to be unacceptable, the status of the selected characteristic determined to be unacceptable is caused by a switching fabric faults within a node.

25. A data communication network, comprising:
a source node;
a destination node operably coupled to the source node via a first connection that carries a data stream, wherein the source node injects diagnostic traffic into the data stream, wherein the destination node monitors the diagnostic traffic in the data stream; and
a control block operably coupled to the source node and the destination node, wherein when status of a selected characteristic associated with the diagnostic traffic is determined to be unacceptable, the control block performs a control plane reroute that establishes a second connection that couples the source node and the destination node, wherein the diagnostic traffic includes operation and management (OAM) performance monitoring traffic, wherein the diagnostic traffic verifies that a level of user plane performance that has been guaranteed to a user is being provided, wherein the control block performs an evaluation of the second connection, wherein the data stream is rerouted over the second connection only if a second connection status of the second connection selected characteristic is better than the status of the selected characteristic.

26. The data communication network of claim 25, wherein the data stream includes a plurality of asynchronous transfer mode (ATM) cells.

27. The data communication network of claim 25, wherein the diagnostic traffic includes operation and management (OAM) continuity checking traffic.

28. The data communication network of claim 27, wherein the status of the selected characteristic is determined to be unacceptable when loss of continuity is detected for a time period that exceeds a predetermined threshold.

29. The data communication network of claim 25, wherein the status of the selected characteristic is determined to be unacceptable when a property associated with OAM performance monitoring exceeds a predetermined threshold.

30. The data communication network of claim 29, wherein the predetermined threshold is configurable.

31. The data communication network of claim 25, wherein the first and second connections are soft permanent virtual circuits.

32. The data communication network of claim 25, wherein the first and second connections are switched connections.

33. The data communication network of claim 25, wherein the data stream is a Multi-Protocol Label Switching (MPLS) data stream and wherein the first and second connections correspond to label switched paths.

34. The data communication network of claim 25, wherein the selected characteristic includes at least one of: data corruption on the first connection, data loss on the first connection, latency along the first connection, and misinsertion of data on the first connection.

35. A method for rerouting a connection in a data communication network, comprising:
 establishing the connection in the data communication network, wherein the connection is managed by a control plane;
 using operation and management (OAM) cells to monitor at least one characteristic of the connection; and
 when status of the at least one characteristic is determined to be unacceptable, initiating control plane rerouting of the connection, wherein the OAM traffic comprises OAM continuity checking traffic, wherein the at least one characteristic includes continuity, wherein the control plane rerouting of the connection comprises evaluating a new connection such that rerouting to the new connection occurs when at least one new connection-characteristic of the new connection is better than the at least one characteristic of the connection.

36. The method of claim 35, wherein the connection is a soft permanent virtual connection (SPVC).

37. The method of claim 35, wherein the connection is switched virtual connection (SVC).

38. The method of claim 35, wherein the control plane is a signaling plane.

39. The method of claim 38, wherein the signaling plane uses private network-to-network interface (PNNI).

* * * * *